United States Patent
Masato et al.

(10) Patent No.: US 11,173,681 B2
(45) Date of Patent: Nov. 16, 2021

(54) PRESS DEVICE AND CONTROL METHOD FOR PRESS DEVICE

(71) Applicant: KOMATSU INDUSTRIES CORPORATION, Kanazawa (JP)

(72) Inventors: Yusuke Masato, Kanazawa (JP); Takashi Masano, Tokyo (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 39 days.

(21) Appl. No.: 16/619,627

(22) PCT Filed: Aug. 7, 2018

(86) PCT No.: PCT/JP2018/029604
§ 371 (c)(1),
(2) Date: Dec. 5, 2019

(87) PCT Pub. No.: WO2019/049586
PCT Pub. Date: Mar. 14, 2019

(65) Prior Publication Data
US 2020/0198279 A1      Jun. 25, 2020

(30) Foreign Application Priority Data
Sep. 6, 2017   (JP) .............................. JP2017-171097

(51) Int. Cl.
*B30B 15/14* (2006.01)
*H02J 7/34* (2006.01)

(52) U.S. Cl.
CPC ............ *B30B 15/148* (2013.01); *H02J 7/345* (2013.01); *B30B 15/142* (2013.01)

(58) Field of Classification Search
CPC ........ B30B 15/14; B30B 15/26; B30B 15/142; B30B 15/148; H02J 7/00714; H02J 7/345
See application file for complete search history.

(56) References Cited

U.S. PATENT DOCUMENTS 4,714,868 A * 12/1987 Maruyama ................ H02J 7/00
320/5
2006/0152185 A1   7/2006 Park
(Continued)

FOREIGN PATENT DOCUMENTS

| CN | 1808891 A | 7/2006 |
| CN | 100368188 C | 2/2008 |

(Continued)

OTHER PUBLICATIONS

The International Search Report for the corresponding international application No. PCT/JP2018/029604, dated Nov. 6, 2018.

*Primary Examiner* — Adam J Eiseman
*Assistant Examiner* — Matthew Stephens
(74) *Attorney, Agent, or Firm* — Global IP Counselors, LLP

(57) ABSTRACT

A press device includes a slide, a bolster disposed below the slide, a servomotor configured to drive the slide, a power storage unit, a current detector, and a control unit. An upper die can be mounted on the slide. A lower die can be placed on the bolster. The power storage unit is configured to be able to supply stored power to the servomotor. The current detector detects current supplied from the power storage unit. The control unit performs stop control to stop supply of current from the power storage unit to the servomotor based on a detection value of the current detector.

9 Claims, 8 Drawing Sheets

(56) References Cited

U.S. PATENT DOCUMENTS

| | | | |
|---|---|---|---|
| 2006/0249038 A1 | 11/2006 | Futamura et al. | |
| 2006/0283229 A1 | 12/2006 | Futamura et al. | |
| 2007/0033431 A1* | 2/2007 | Pecone | G06F 11/3058 |
| | | | 714/6.12 |
| 2013/0169204 A1* | 7/2013 | Kuboe | H02M 1/32 |
| | | | 318/400.3 |
| 2014/0293665 A1* | 10/2014 | Hart | H02M 1/32 |
| | | | 363/49 |
| 2015/0352799 A1* | 12/2015 | Yamada | B30B 15/14 |
| | | | 714/6.12 |
| 2017/0016958 A1 | 1/2017 | Saito et al. | |

FOREIGN PATENT DOCUMENTS

| | | | | |
|---|---|---|---|---|
| CN | 100408321 C | | 8/2008 | |
| CN | 106357168 A | | 1/2017 | |
| JP | 2001-185228 A | | 7/2001 | |
| JP | 2001185228 A | * | 7/2001 | ............ Y02E 60/10 |
| JP | 2003-230997 A | | 8/2003 | |
| JP | 2003230997 A | * | 9/2003 | ............ B30B 15/14 |
| JP | 2007170373 A | * | 7/2007 | ............ F02D 41/20 |
| JP | 2008-183624 A | | 8/2008 | |
| JP | 2009-148130 A | | 7/2009 | |
| JP | 2010-260094 A | | 11/2010 | |
| JP | 2010260094 A | * | 11/2010 | ............ B30B 15/14 |
| JP | 2017-20923 A | | 1/2017 | |

\* cited by examiner

PRESS DEVICE AND CONTROL METHOD FOR PRESS DEVICE

CROSS-REFERENCE TO RELATED APPLICATIONS

This application is a U.S. National stage application of International Application No. PCT/JP2018/029604, filed on Aug. 7, 2018. This U.S. National stage application claims priority under 35 U.S.C. § 119(a) to Japanese Patent Application No. 2017-171097, filed in Japan on Sep. 6, 2017, the entire contents of which are hereby incorporated herein by reference.

BACKGROUND

Filed of the Invention

The present invention relates to a press device and a method for controlling a press device.

Background Information

Automobile manufacturers, for example, produce body panels and the like with a press device that makes use of dies. In recent years, servomotor-driven press machines have been used as press devices.

With a servomotor-driven press machine such as this, the peak power is quite high during pressing, and there may be problems such as flickering due to a drop in the voltage inside or outside the plant.

Meanwhile, a configuration has been disclosed in which an aluminum electrolytic capacitor is installed in a press device in order to keep the peak power down (see JP-A 2003-230997, for example).

SUMMARY

However, when using a power storage device that makes use of an electrolytic solution, if a large current flows in a short time, the electrolytic solution may vaporize, which can degrade the storage performance (decrease the capacity, shorten the service life, etc.).

It is an object of the present invention to provide a press device and a method for controlling a press device with which deterioration of the storage capacity can be reduced.

To achieve the stated object, the press device according to one aspect of the invention comprises a slide, a bolster, a servomotor, a power storage unit, a current detector, and a control unit. An upper die can be attached to the slide. The bolster is disposed below the slide, and a lower die can be placed thereon. The servomotor drives the slide. The power storage unit can supply stored electric power to the servomotor. The current detector detects the current supplied from the power storage unit. The control unit performs stop control to stop the supply of current from the power storage unit to the servomotor on the basis of the detection value of the current detector.

Also, the method for controlling a press device according to another aspect of the invention comprises a detection step, and a stopping step. The detection step involves detecting the current supplied from the power storage unit to the servomotor that drives the slide. The stopping step involves stopping the supply of current from the power storage unit to the servomotor on the basis of the detection value in the detection step.

The present invention provides a press device and a method for controlling a press device with which deterioration of storage performance can be reduced.

DETAILED DESCRIPTION OF EMBODIMENT(S)

The press device of the present invention will now be described with reference to the drawings.

1. Configuration 1-1. Overview of Press Device

Figure 1:
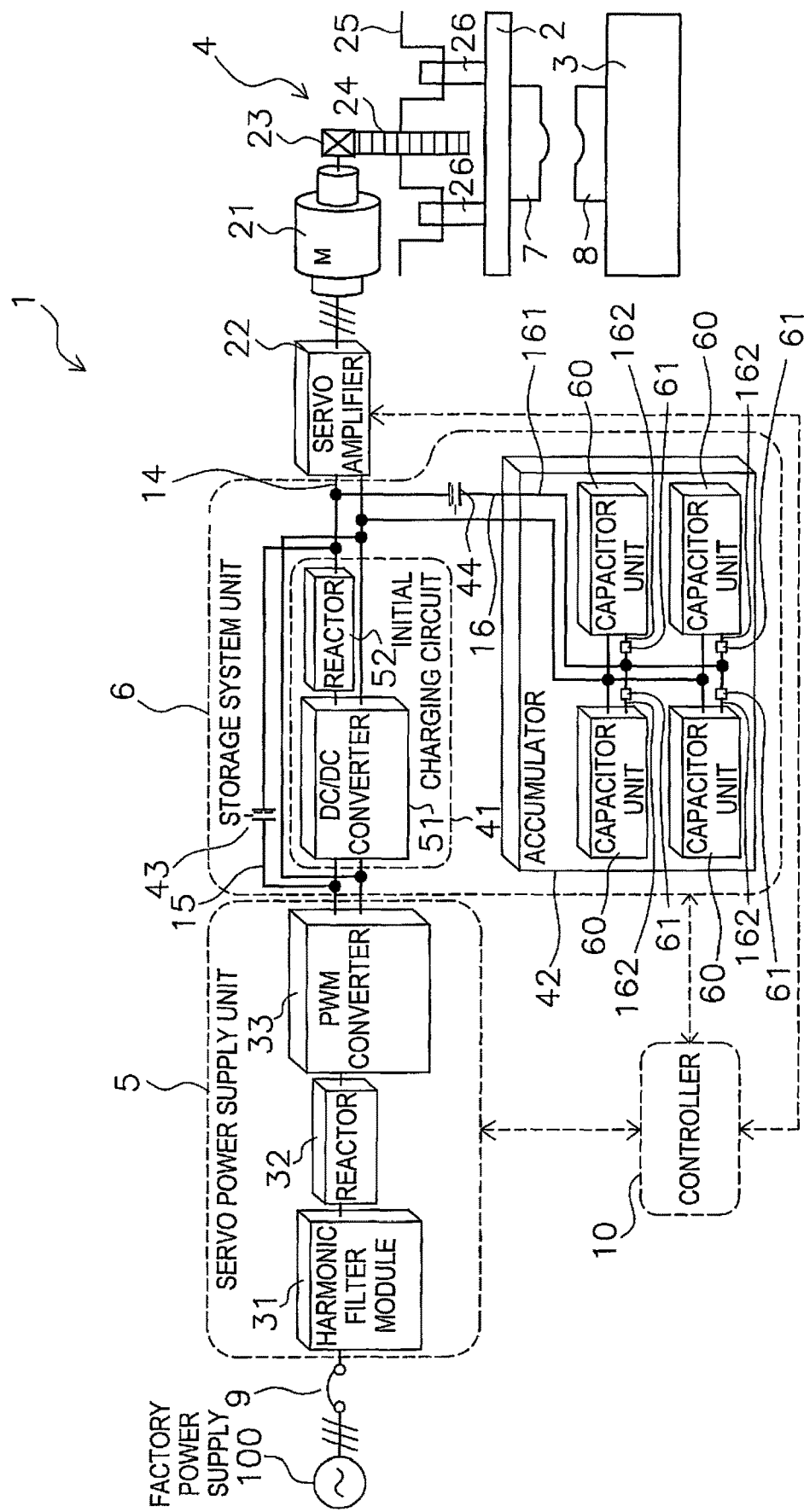
FIG. 1 is a simplified view of a press device according to an embodiment of the present invention.

FIG. 1 is a simplified view of the configuration of a press device 1 in an embodiment of the present invention.

The press device 1 in this embodiment subjects a material to pressing using an upper die 7 and a lower die 8. The press device 1 mainly comprises a slide 2, a bolster 3, a slide driver 4, a servo power supply unit 5, a storage system unit 6, a main breaker 9, and a controller 10.

The upper die 7 is attached to the lower face of the slide 2. The lower die 8 is placed on the upper face of the bolster 3. The slide driver 4 moves the slide 2 up and down. The servo power supply unit 5 converts alternating current supplied from a factory power supply 100 into direct current and outputs it to the storage system unit 6. The storage system unit 6 stores the regenerative power generated in the factory power supply 100 or the slide driver 4. The main breaker 9 switches on and off the power supplied from the factory power supply 100 to the press device 1. The controller 10 controls the slide driver 4, the servo power supply unit 5, and the storage system unit 6.

1-2. Slide Driver

The slide driver 4 has a servomotor 21, a servo amplifier 22, a pinion gear 23, a main gear 24, a crankshaft 25, and a connecting rod 26. The servomotor 21 is the drive source for the slide 2. The servo amplifier 22 supplies drive current to the servomotor 21. The pinion gear 23 is linked to the servomotor 21 and is rotated by the rotation of the servomotor 21. The main gear 24 meshes with the pinion gear 23 and rotates along with the pinion gear 23. The crankshaft 25 is linked to the main gear 24 and is rotated by the rotation of the main gear 24. The connecting rod 26 connects the crankshaft 25 and the slide 2. In this embodiment, two connecting rods 26 are provided.

When the servomotor 21 is rotated by the drive current from the servo amplifier 22, the pinion gear 23 rotates, and the main gear 24 also rotates along with the pinion gear 23. The crankshaft 25 is rotated by the rotation of the main gear 24, and the connecting rods 26 move up and down. As a result, the slide 2 to which the connecting rods 26 are connected also moves up and down.

1-3. Servo Power Supply Unit

The servo power supply unit 5 has a harmonic filter module 31, a reactor 32, and a PWM converter 33. The harmonic filter module 31 prevents harmonic waves generated in the PWM converter 33 from going back to the factory power supply 100 side.

The reactor 32 and the PWM converter 33 constitute a chopper circuit, which converts alternating current into direct current and boosts the voltage. The plant power supply 100 supplies alternating current of a certain voltage, and the PWM converter 33 outputs direct current of a voltage higher than this certain voltage. The PWM converter 33 and the servo amplifier 22 are connected by a DC bus line 14. The PWM converter 33 also monitors the voltage on the DC bus line 14.

1-4. Storage System Unit

The storage system unit 6 has an accumulator 42 provided with a plurality of electric double layer capacitors 601 (see FIG. 2, described below), an initial charging circuit 41 that charges the electric double layer capacitors 601 before operation, a short circuit contactor 43 that bypasses the initial charging circuit 41, and a short circuit contactor 44 that interrupts the supply of current from the electric double layer capacitors 601 to the servomotor 21.

1-4-1. Initial Charging Circuit

The initial charging circuit 41 is provided on the DC bus line 14 and is a circuit for charging the electric double layer capacitors 601 (described below) provided to the accumulator 42. That is, since the electric double layer capacitors 601 of the accumulator 42 are not charged before operating the press device 1, they are charged with the power supplied from the factory power supply 100. The initial charging circuit 41 has a DC/DC converter 51 and a reactor 52. The initial charging circuit 41 throttles the current so that it will not flow all at once into the electric double layer capacitors 601 during charging.

1-4-2. Short Circuit Contactor

The short circuit contactor 43 is provided on a bypass line 15 connected to the DC bus line 14 so as to bypass the initial charging circuit 41. That is, the bypass line 15 is connected to the DC bus line 14 on the PWM converter 33 side of the initial charging circuit 41, and is connected to the DC bus line 14 on the servo amplifier 22 side of the initial charging circuit 41. When the short circuit contactor 43 is switched on, the current outputted from the PWM converter 33 bypasses the initial charging circuit 41 and is supplied to the servo amplifier 22.

1-4-3. Accumulator

The accumulator 42 has four capacitor units 60 provided with 24 electric double layer capacitors 601 (see FIG. 2), and four current sensors 61.

Figure 2:
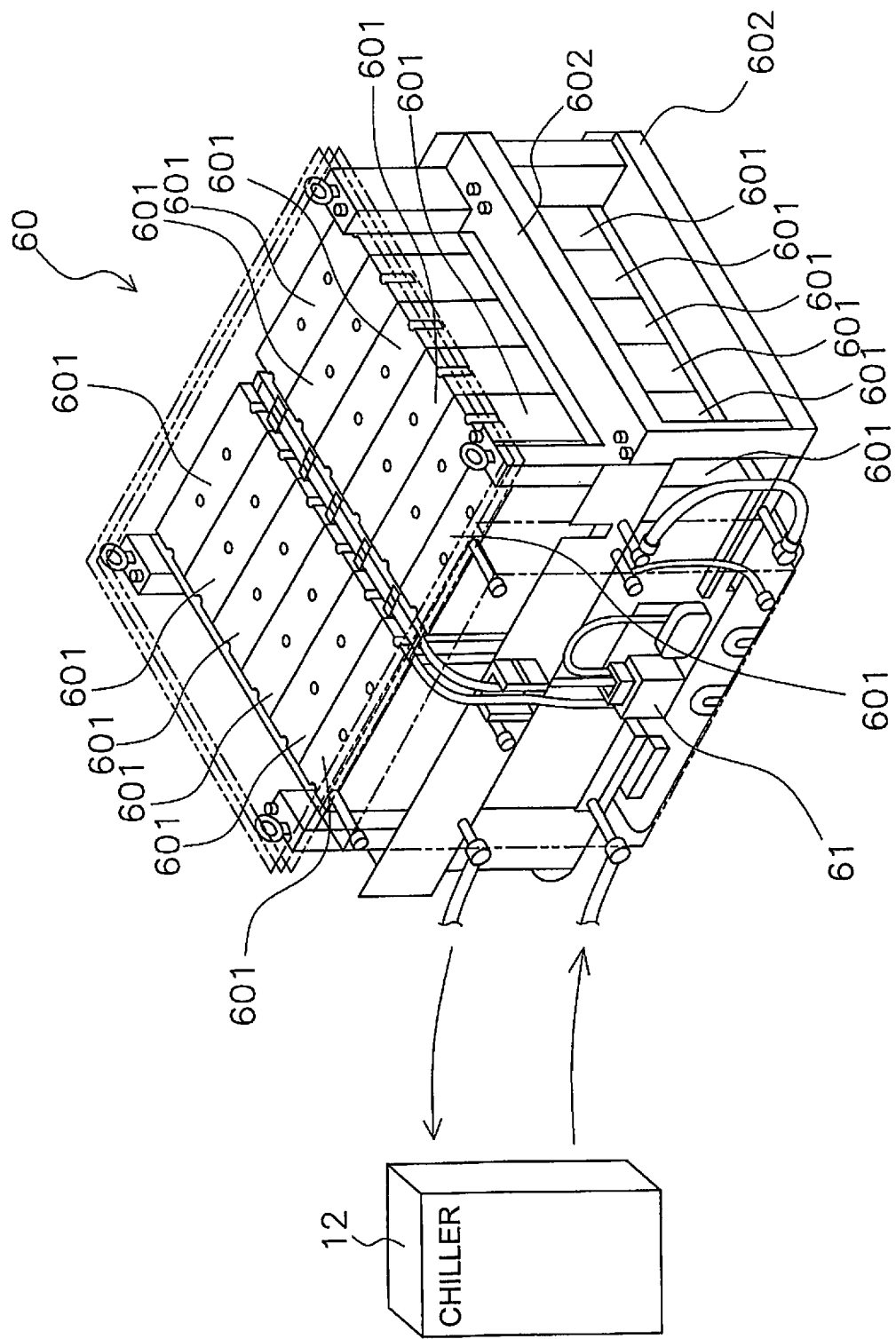
FIG. 2 is a oblique view of the capacitor unit of the press device in FIG. 1.

FIG. 2 is a view of a capacitor unit 60 provided to the accumulator 42. In this embodiment, the capacitor unit 60 has two heat sinks 602 and 24 serially connected electric double layer capacitors 601.

The two heat sinks 602 are disposed one above the other. In the capacitor unit 60, a heat sink 602 and twelve electric double layer capacitors 601 mounted on the heat sink 602 are provided in two levels. The two heat sinks 602 and the 24 electric double layer capacitors 601 are fixed by a frame member or the like. The heat sinks 602 are plate-shaped members formed from aluminum, and channels through which cooling water flows are formed in the heat sinks 602. The cooling water is supplied from a chiller 12 to the channels of the heat sinks 602. The cooling water is circulated by the chiller 12.

With the press device 1 in this embodiment, as shown in FIG. 1, four capacitor units 60 are provided, and the four capacitor units 60 are connected in parallel to a line (specifically, the DC bus line 14) that supplies power from the factory power supply 100 to the servomotor 21. More precisely, the four capacitor units 60 are coupled between the servo amplifier 22 and the part of the DC bus line 14 where the bypass line 15 is connected. Incidentally, reference in this Specification to the voltage of the electric double layer capacitors 601 indicates the voltage of a capacitor unit 60 (24 electric double layer capacitors 601 connected in series).

The four capacitor units 60 are connected to the DC bus line 14 by a connection line 16. The connection line 16 has a common line 161 connected to the DC bus line 14, and individual lines 162 connecting the capacitor units 60 and the common line 161.

The current sensors 61 are provided on the individual lines 162. The current sensors 61 measure the current flowing from each capacitor unit 60 to the DC bus line 14 at regular time intervals (such as 1 msec).

1-4-4. Short Circuit Contactor

The short circuit contactor 44 is provided on the common line 161. When the short circuit contactor 44 has been switched on, the four capacitor units 60 and the DC bus line 14 are electrically coupled, and current can be supplied from the four capacitor units 60 to the DC bus line 14. Also, when the short circuit contactor 44 has been switched off, the four capacitor units 60 and the DC bus line 14 are electrically uncoupled, and the supply of current from the four capacitor units 60 to the DC bus line 14 is stopped.

1-5. Controller

Figure 3:
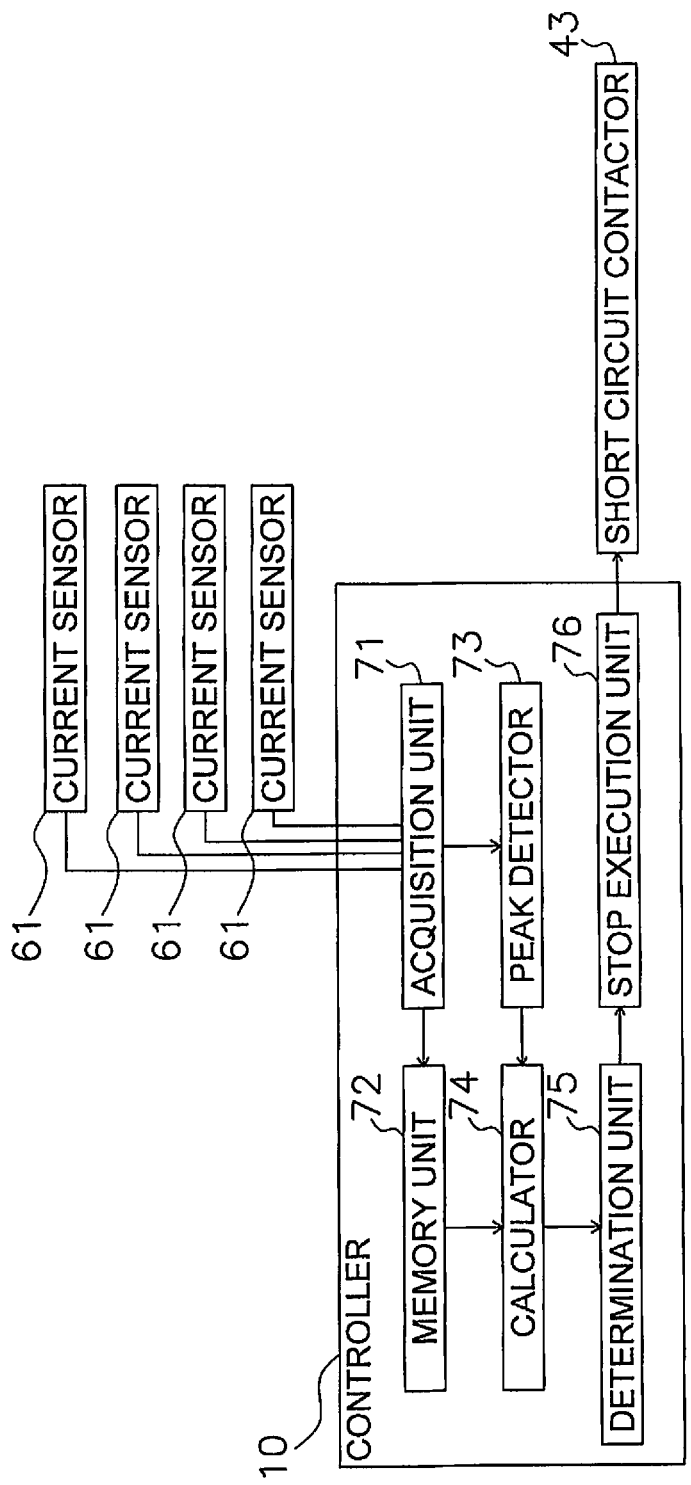
FIG. 3 is a block diagram of the configuration of the controller of the press device in FIG. 1.

FIG. 3 is a block diagram of the configuration of the controller 10. The controller 10 has at least an acquisition unit 71, a memory unit 72, a peak detector 73, a calculator 74, a determination unit 75, and a stop execution unit 76.

The acquisition unit 71 acquires current values detected by the four current sensors 61 at regular time intervals (such as 1 msec).

The memory unit 72 stores the current value acquired by the acquisition unit 71. The memory unit 72 separately stores the current value for each capacitor unit 60.

The peak detector 73 detects the peak of the current acquired by each current sensor 61. The peak detector 73 compares, for example, the current value acquired this time from a current sensor 61 with the current value acquired the last time, and if the current value acquired this time is lower than the current value acquired the last time, it is detected that the current value reached its peak at the point of detecting the current value acquired the last time.

The calculator 74 calculates the average value of the current over a specific determination time centered on the point of detecting the current value acquired the last time. A plurality of determination times are set, and the average value of the current is calculated at the times of 2 msec, 10 msec, 20 msec, 50 msec, and 100 msec, for example.

The determination unit 75 compares the average value of the current calculated for a determination time with a threshold set for that determination time, and determines whether or not the average value of the current is over the threshold.

Figure 4:
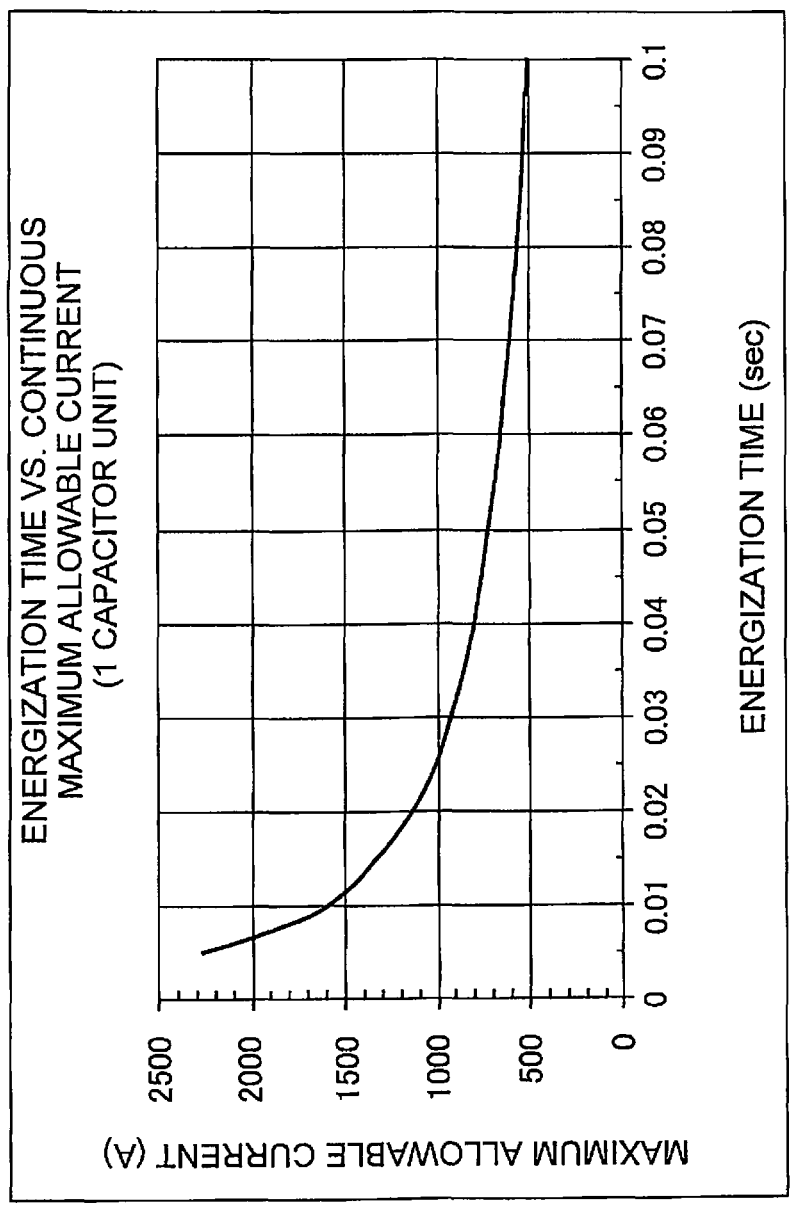
FIG. 4 is a graph of the relationship between the energization time of the capacitor unit in FIG. 2 and the maximum allowable current under continuous energization.

FIG. 4 is a graph of the value of the maximum current that can be supplied continuously, with respect to the energization time of one capacitor unit 60. In FIG. 4, for example, the maximum allowable current at 0.02 sec is 1200 A. This indicates that when a current of 1200 A is continuously supplied for 0.02 sec, this is the maximum current value that the capacitor unit 60 can tolerate. That is, using 1200 A as the threshold at 0.02 sec, it is determined that the capacitor unit 60 will be degraded if current having a value greater than 1200 A is continuously supplied for 0.02 sec. Also, the maximum allowable current at 0.05 sec is 720 A. Therefore, it is determined that the capacitor unit 60 will be degraded if current having a value greater than 720 A is continuously supplied for 0.05 sec.

In this embodiment, an average value is used, and if the determination time is 0.02 sec, it is determined that the capacitor unit 60 will be degraded if the average value during that time exceeds 1200 A. Further, if the determination time were 0.05 sec, it would be determined that the capacitor unit 60 will be degraded if the average value during that time exceeds 720 A.

Thus, the threshold at a determination time of 50 ms is set to a value lower than the threshold at a determination time of 20 ms, and the threshold for a longer determination time is set to a lower value.

When it has been determined by the determination unit 75 that the average value of the current at a specific determination time is over the threshold value, the stop execution unit 76 turns off the short circuit contactor 44 to cut off the flow of current in the connection line 16. This stops the supply of current from the four capacitor units 60 to the servo amplifier 22.

2. Operation

Figure 5A:
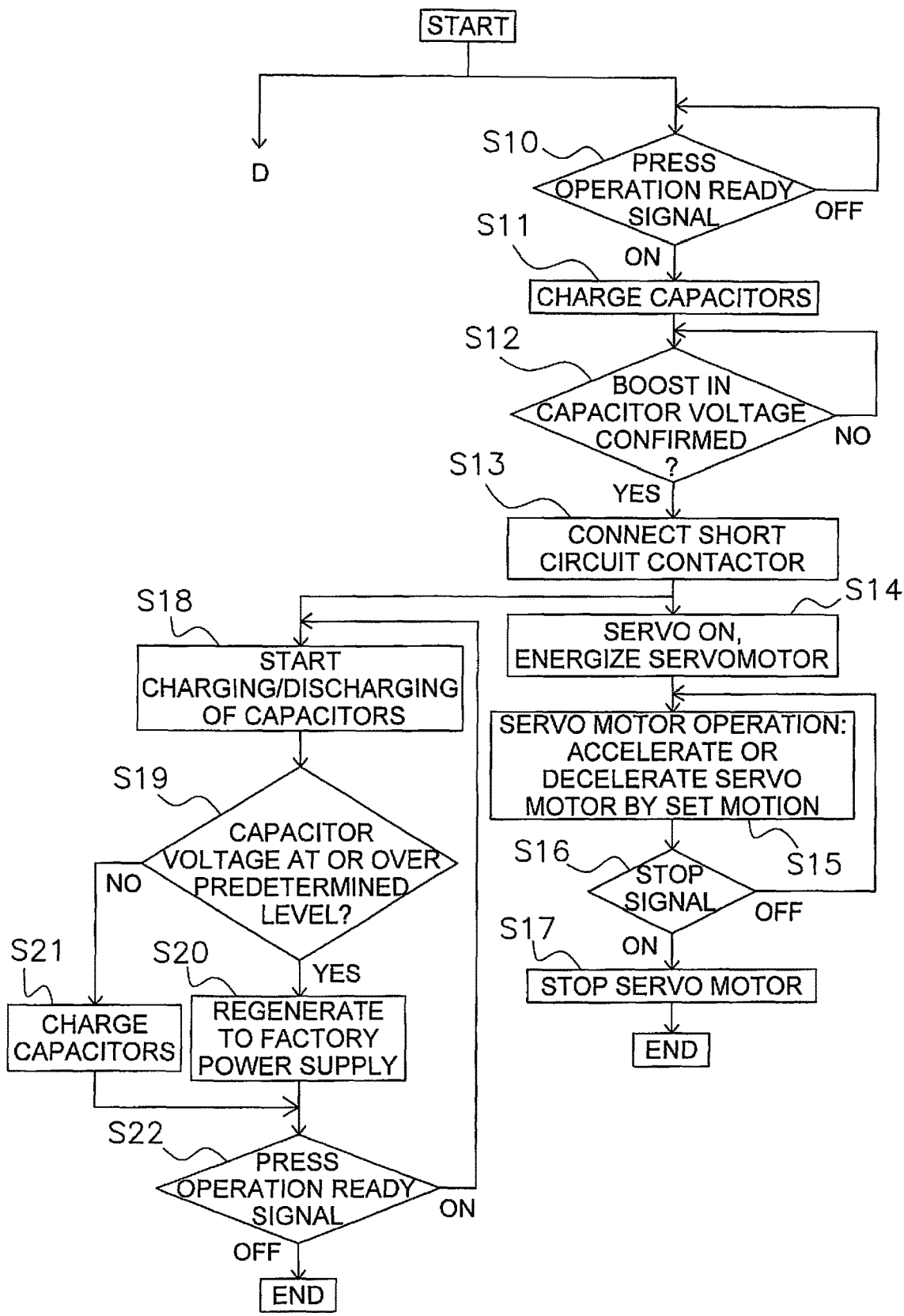
FIG. 5A is a flowchart of the control operation of the press device in FIG. 1.
Figure 5B:
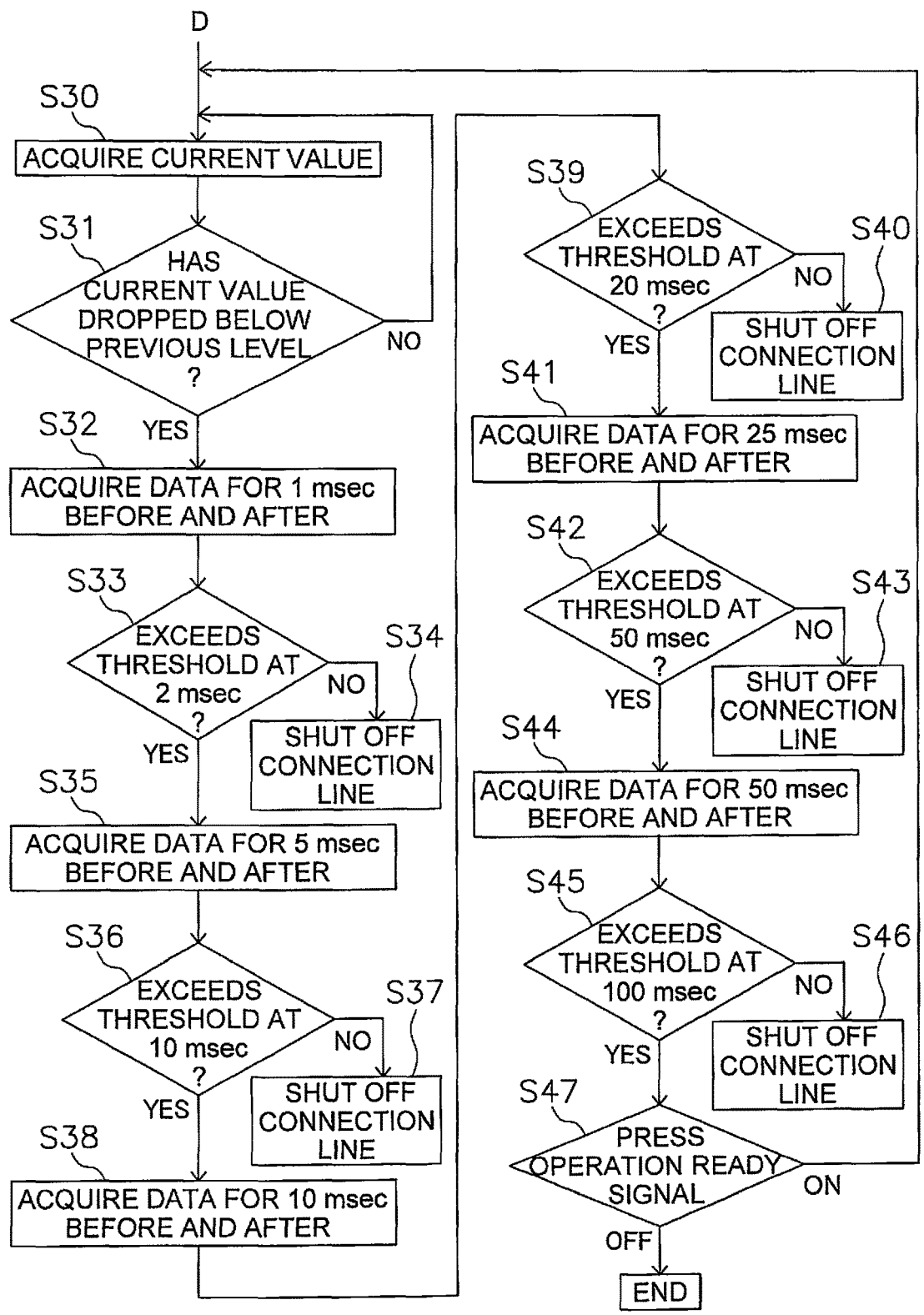
FIG. 5B is a flowchart of the control operation of the press device in FIG. 1.

The operation of the press device 1 in an embodiment of the present invention will now be described, and an example of the method for controlling the press device of the present invention will also be described. FIGS. 5A and 5B are flowcharts of the control of the press device 1 in this embodiment.

First, control in the press operation will be described with reference to steps S10 to S22, and then stop control for stopping the supply of current from the capacitor units 60 will be described with reference to steps S30 to S47.

First, in step S10, it is detected whether or not a press operation ready signal is being outputted from the controller 10. The press operation ready signal is a signal that is outputted when the user presses a button when operating the press device 1, and is a signal indicating that the press device 1 is ready to operate normally.

Next, in step S11 the electric double layer capacitors 601 are charged. Since the short circuit contactor 43 is in its off state, no current flows to the bypass line 15, and the power outputted from the PWM converter 33 flows to the initial charging circuit 41. An electric charge is accumulated in the electric double layer capacitors 601 connected to the DC bus line 14 while current control is performed by the DC/DC converter 51 of the initial charging circuit 41. The DC/DC converter 51 monitors the voltage of the DC bus line 14. In step S12, charging is performed until the voltage of the electric double layer capacitors 601 is boosted to a predetermined level. The DC/DC converter 51 concludes that charging is complete when the input voltage and the output voltage match, and halts the operation.

When it is detected in step S12 that the voltage of the electric double layer capacitors 601 has been boosted to the predetermined level by the DC/DC converter 51, in step S13 the controller 10 connects the short circuit contactor 43. Consequently, the output from the PWM converter 33 bypasses the initial charging circuit 41 and is supplied to the servo amplifier 22, and charging and discharging from the electric double layer capacitors 601 is commenced in step S18.

When the short circuit contactor 43 is connected in step S13, the controller 10 energizes the servomotor 21 in step S14.

Next, in step S15 the servomotor 21 is operated in accordance with the set motion to move the slide 2 up and down. As the slide 2 moves downward, the servomotor 21 accelerates up to a predetermined speed, after which it is driven at a constant speed. Along with the rotation of the crankshaft 25 produced by the drive of the servomotor 21, the slide 2 rises after reaching bottom dead center. Then, the servomotor 21 is decelerated from a specific position in order to stop the slide 2 at top dead center.

When a stop signal for the servomotor 21 is outputted in step S16, the servomotor 21 is stopped in step S17. As a result, the slide 2 stops at top dead center.

Figure 6:
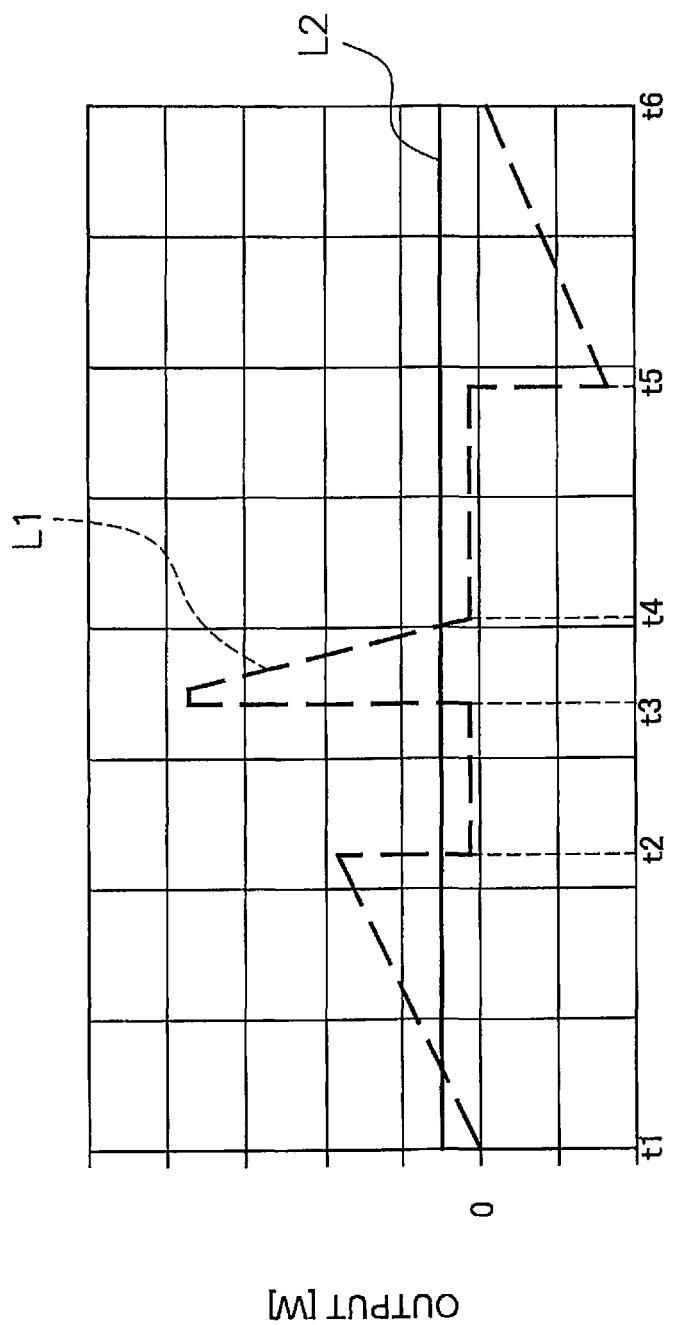
FIG. 6 is a graph of the power supplied from a factory power supply when using the press device in FIG. 1.

The change in power consumption during pressing will be described with reference to FIG. 6. FIG. 6 is a graph of the change in power during pressing. A dotted line L1 and a solid line L2 are shown in FIG. 6. The dotted line L1 shows the change over time in the power consumption of the press 1 during pressing. The solid line L2 shows the change over time in the power supplied from the factory power supply 100.

The downward movement of the slide 2 begins at the time t1 in FIG. 6, and from the time t1 to t2, the servomotor 21 is accelerated until it reaches a predetermined speed, and the servomotor 21 consumes power. When power is consumed by the servomotor 21 and the voltage of the DC bus line 14 decreases, a preset constant power is supplied from the servo power supply unit 5. As shown by the solid line L2, since only constant power is supplied from the servo power supply unit 5, any shortfall is supplied from the electric double layer capacitors 601. That is, any amount exceeding the solid line L2 in the dotted line L1 is supplied from the electric double layer capacitors 601.

When the speed of the servomotor 21 reaches a predetermined speed at the time t2, the servomotor 21 is driven at a constant speed from the time t2. Since the load on the servomotor 21 is low from the time t2 to the time t3 at which the upper die 7 comes into contact with the material (workpiece), the power consumption indicated by the dotted line L1 is also low. At this point, the electric double layer capacitors 601 are charged with the electric power exceeding the dotted line L1 in the solid line L2.

Next, the slide 2 is further lowered at the time t3, and pressing is performed on the workpiece until the time t4. The power consumption peaks at this point, but as described above, a preset constant power is supplied from the servo power supply unit 5, and any shortfall in power is supplied from the electric double layer capacitors 601.

When the slide 2 reaches a predetermined position, the controller 10 decelerates the servomotor 21 to stop the slide 2 at top dead center. The time t5 in FIG. 6 indicates the deceleration start time of the servomotor 21, and the time t6 indicates the end of this deceleration. As shown in FIG. 6, from the time t5 to t6, the output is on the negative side, and regenerative power is being generated in the servomotor 21. This regenerative power is used to charge the electric double layer capacitors 601.

On the other hand, during the press working of steps S14 to S17, the control of steps S18 to S22 is performed in parallel. As described above, the connection of the short circuit contactor 43 in step S13 commences the charging and discharging of the electric double layer capacitors 601 in step S18.

Then, in the next step S19, the PWM converter 33 determines whether or not the voltage of the DC bus line 14 is at or over a predetermined level. If the voltage of the DC bus line 14 is at or over the predetermined level, control proceeds to step S20, and the power is regenerated to the factory power supply 100 by the power regeneration function of the PWM converter 33. Since the voltage of the DC bus line 14 is equal to the voltage of the electric double layer capacitors 601, the PWM converter 33 is detecting the voltage of the electric double layer capacitors 601. That is, if the charge amount of the electric double layer capacitors 601 is at or over a predetermined level, the regenerative power generated by the servomotor 21 is sent to the factory power supply 100. Also, if the voltage of the DC bus line 14 is lower than the predetermined voltage in step S19, the electric double layer capacitors 601 are charged in step S21.

In the next step S22 it is determined whether or not a press operation ready signal is being outputted from the controller 10. As long as a press operation ready signal is being detected, steps S18 to S21 are repeated. Also, when it is detected in step S22 that the press operation ready signal is not being outputted from the controller 10, the control comes to an end.

After the electric double layer capacitors 601 have been charged the first time, they are charged by regenerative power produced during deceleration of the servomotor 21 or the like. For this reason, charging from the factory power supply 100 need not be performed.

As described above, because the chargeable electric double layer capacitors 601 are provided, any shortfall in power will be supplied from the electric double layer capacitors 601, so the power supplied from the factory power supply 100 can be held constant as shown in FIG. 6.

The operation of steps S30 to S47, which is an example of stop control, is performed as shown in FIG. 5B, in parallel with the operation of steps S10 to S22, which is an example of the press control described above.

In step S30, the acquisition unit 71 acquires current values detected by the four current sensors 61 at regular time intervals (such as 1 msec). The acquired current values are stored in the memory unit 72.

In step S31, the peak detector 73 determines whether the current value at this detection timing has dropped below the current value at the previous detection timing, in the detection values of each current sensor 61. If it has dropped below this, a peak is detected to have occurred in the current value at the previous detection timing. The peak occurs at the time t3 in FIG. 6, for example.

Figure 7:
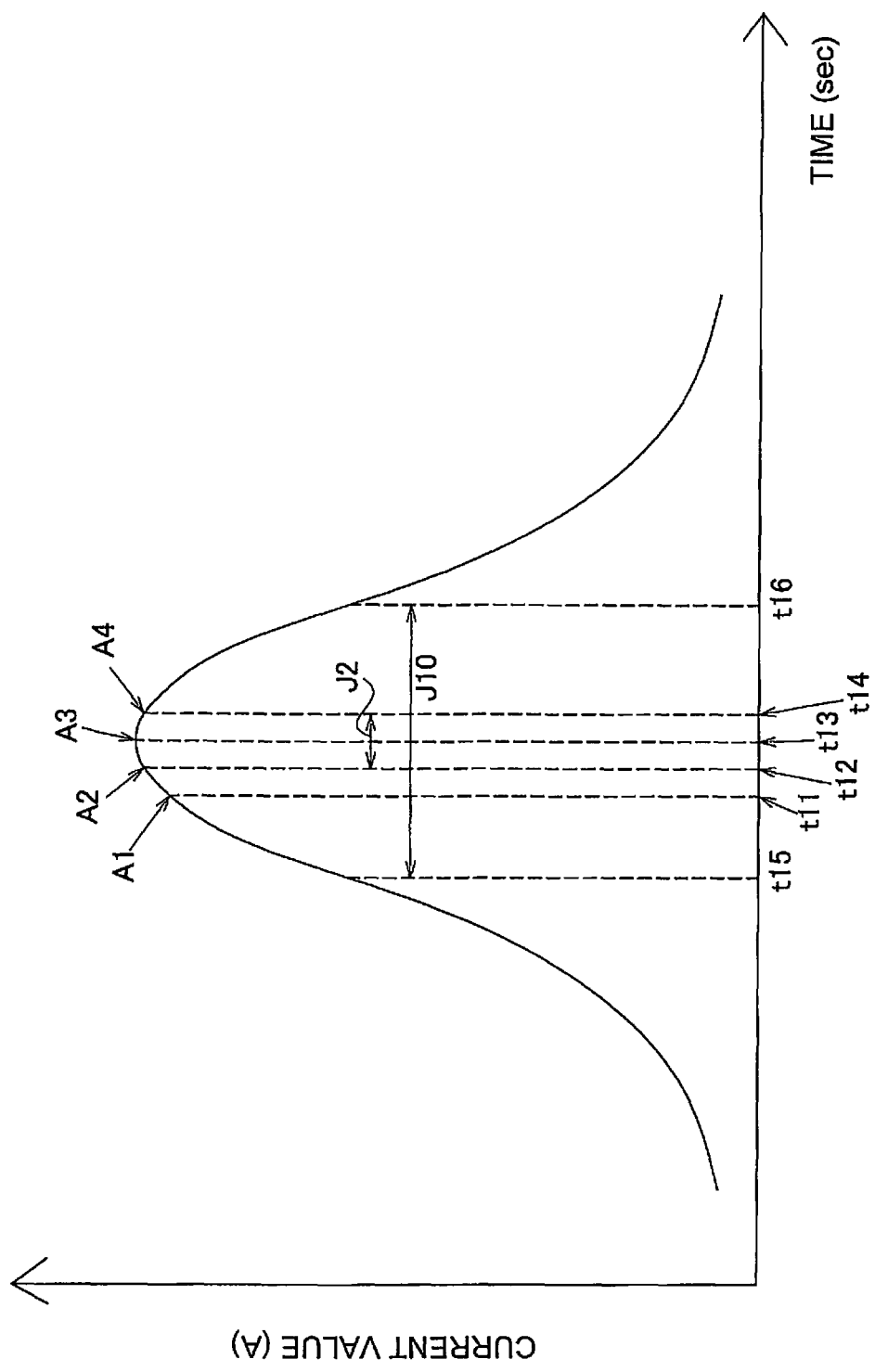
FIG. 7 is a graph of the change over time in the current value sensed by the current sensor in FIG. 1.

FIG. 7 is a graph of an example of the change in current value detected by one current sensor 61. It is assumed that the current value is acquired every 1 ms. For example, a comparison of the current value A1 acquired at the time t11 with the current value A2 acquired at the time t12 (t11+1 msec), which is the next detection timing after the time t11, reveals that the current value A2 is larger, so the determination in step S30 is repeated. Next, the peak detector 73 compares the current value A3 acquired at the time t13 (t12+1 msec) with the current value A2 acquired at the time t12, and since the current value A3 is larger than the current value A2, step S30 is repeated again.

Next, the peak detector 73 compares the current value A4 acquired at the time t14 (t13+1 msec) with the current value A3 acquired at the time t13, and since the current value A4 acquired at the time t14 (the detection timing this time) is smaller than the current value A3 acquired at the time t13 (the previous detection timing), it is detected that the peak of the current value occurred at the time t13.

Next, in step S32 the calculator 74 calculates the average value of the current at a determination time of 2 msec. The calculator 74 acquires from the memory unit 72 data about the current values at 1 msec before and after the time t13 (indicated by the determination period J2 in FIG. 7), which is the timing of the current peak. More specifically, the calculator 74 acquires current values at the times t12, t13, and t14. The calculator 74 then calculates the average value of the current for 2 msec, centered on the time t13. That is, the average value of the current values A2, A3, and A4 at the times t12, t13, and t14 shown in FIG. 7 is calculated.

Next, in step S33 the determination unit 75 compares the threshold value that has been preset at a determination time of 2 msec stored in the memory unit 72 with the average value of the current calculated by the calculator 74. If it is determined that the average value of the current is over the threshold value, the control proceeds to step S34. Here, the threshold is set to the maximum allowable current value shown in FIG. 4. That is, the threshold value at 2 msec is set to the maximum current value that will not lead to degradation of a capacitor unit 60 when the capacitor unit 60 continuously supplies current for 2 msec. The same applies to the threshold in the following 10 msec determination time, the threshold in the 20 msec determination time, the threshold in the 50 msec determination time, and the threshold in the 100 msec determination time.

Then, in step S34 the stop execution unit 76 shuts off the short circuit contactor 44 and stops the supply of current from the four capacitor units 60 to the servo amplifier 22.

On the other hand, when it is determined in step S33 that the average value of the current is at or below the threshold value, in step S35 the calculator 74 calculates the average value of the current in a determination time of 10 msec. The calculator 74 acquires from the memory unit 72 data about the current values 5 msec before and after the peak time t13 (between the times t5 and t6). In FIG. 7, the determination period of 10 msec is labeled the determination period J10. The calculator 74 then calculates the average value of the acquired current value data (11 pieces of data for the times t15 to t16).

Next, in step S36 the determination unit 75 compares the threshold value that has been set at a determination time of 10 msec stored in the memory unit 72 with the average value of the current calculated by the calculator 74. If it is determined that the average value of the current is over the threshold value, the control proceeds to step S37, the shorting contactor 44 is turned off by the stop execution unit 76, and the supply of current from the four capacitor units 60 to the servo amplifier 22 is stopped.

On the other hand, if it is determined in step S36 that the average value of the current is at or below the threshold value, the calculator 74 calculates the average value of the current at a determination time of 20 msec in step S38. The calculator 74 acquires data about the current values 10 msec before and after the peak time t13 from the memory unit 72. The calculator 74 then calculates the average value of the acquired current value data.

Next, in step S39 the determination unit 75 compares the threshold value that has been set at a determination time of 20 msec stored in the memory unit 72 with the average value of the current calculated by the calculator 74. If it is determined that the average value of the current is over the threshold value, the control proceeds to step S40, the shorting contactor 44 is turned off by the stop execution unit 76, and the supply of current from the four capacitor units 60 to the servo amplifier 22 is stopped.

On the other hand, if it is determined in step S39 that the average value of the current is at or below the threshold value, the calculator 74 calculates the average value of the current at a determination time of 50 msec in step S41. The calculator 74 acquires from the memory unit 72 data about the current values of 25 msec before and after the peak time t13. The calculator 74 then calculates the average value of the acquired current value data.

Next, in step S42 the determination unit 75 compares the threshold value that has been set at a determination time of 50 msec stored in the memory unit 72 with the average value of the current calculated by the calculator 74. If it is determined that the average value of the current is over the threshold value, the control proceeds to step S43, the shorting contactor 44 is turned off by the stop execution unit 76, and the supply of current from the four capacitor units 60 to the servo amplifier 22 is stopped.

On the other hand, if it is determined in step S42 that the average value of the current is at or below the threshold, in step S44 the calculator 74 calculates the average value of the current at a determination time of 100 msec. The calculating unit 74 acquires from the memory unit 72 data about the current values of 50 msec before and after the peak time t13. The calculator 74 then calculates the average value of the acquired current value data.

Next, in step S45 the determination unit 75 compares the threshold value that has been set at a determination time of 100 msec stored in the memory unit 72 with the average value of the current calculated by the calculator 74. If it is determined that the average value of the current is over the threshold value, the control proceeds to step S46, the shorting contactor 44 is turned off by the stop execution unit 76, and the supply of current from the four capacitor units 60 to the servo amplifier 22 is stopped.

On the other hand, if it is determined in step S45 that the average value of the current is at or below the threshold value, in step S47 it is determined whether the press operation ready signal is off or on, and if it is on, control goes back to step S30, and when a peak is next detected, the control of steps S32 to S46 is performed.

On the other hand, if the press operation read signal is off in step S47, control comes to an end.

Thus, when the peak of the current is detected, it is determined whether or not the threshold set for each of a plurality of determination times centered on this peak has been exceeded, and if the threshold has been exceeded, it is determined that there is a possibility of degradation of the capacitor units 60, and the supply of current from the four capacitor units 60 to the servomotor 21 is stopped. The operation of the press device 1 may also be stopped along with the switching of the short circuit contactor 44 to its off state.

3. Features, Etc.

(3-1)

The press device 1 in this embodiment comprises the slide 2, the bolster 3, the servomotor 21, the capacitor units 60 (an example of power storage units), the current sensors 61 (an example of current detectors), and the controller 10 (an example of a control unit). The upper die 7 can be mounted on the slide 2. The bolster 3 is disposed below the slide 2 and the lower die 8 can be placed thereon. The servomotor 21 drives the slide 2. The capacitor units 60 can supply stored power to the servomotor 21. The current sensors 61 sense the current supplied from the capacitor units 60. The controller 10 performs stop control to stop the supply of current from the capacitor units 60 to the servomotor 21 on the basis of the detection values of the current sensors 61.

Consequently, when a large current flows from the capacitor units 60 in a short time and leads to degradation of the capacitor units 60, the supply of current from the capacitor units 60 to the servomotor 21 can be stopped. Therefore, the effect of the flow of a large current in a short time on the electric double layer capacitors 601 can be minimized to reduce the capacity reduction and the shortening of service life, and deterioration in the storage performance can be reduced.

(3-2)

The press device 1 in this embodiment further comprises the short circuit contactor 44 (an example of a shutoff unit). The short circuit contactor 44 shuts off the common line 161 (an example of a current line) from the capacitor units 60 to the servomotor 21. The controller 10 performs stop control by actuating the short circuit contactor 44.

Thus, the supply of current from the capacitor units 60 to the servomotor 21 can be stopped.

(3-3)

With the press device 1 in this embodiment, the controller 10 (an example of a control unit) performs stop control when it is determined that the average value of the current supplied from the capacitor unit has exceeded a specific threshold in a specific determination time.

Consequently, a large current in a short time that may degrade the storage performance of the electric double layer capacitors can be detected before it flows, so that the degradation of storage performance can be reduced.

(3-4)

With the press device 1 in this embodiment, the controller 10 (an example of a control unit) has the acquisition unit 71, the peak detector 73, the calculator 74, the determination unit 75, and the stop execution unit 76. The acquisition unit 71 acquires detection values from the current sensor 61 at specific time intervals. The peak detector 73 detects the peak of the current value on the basis of the detected values. The calculator 74 calculates the average value of the current at a determination time centered on the peak of the current value. The determination unit 75 compares the average value of the current calculated by the calculator 74 with a specific threshold, and determines whether or not the average value of the current is over the specific threshold. The stop execution unit 76 performs stop control when the determination unit 75 has determined that the average value of the current is over the specific threshold.

Consequently, the average value of the current can be calculated within a length of time including the time t13 at which the current value reaches its peak, so it can be determined whether or not to perform stop control within a time period in which there is a high probability that a large amount of current will flow in a short time.

(3-5)

With the press device 1 in this embodiment, a plurality of determination times of different durations (for example, 2 msec, 5 msec, 10 msec, 20 msec, 50 msec, and 100 msec) are provided. A specific threshold is provided corresponding to each determination time. The longer is a determination time, the lower is the corresponding specific threshold set.

Since the current value that will affect service life deterioration and the like of the electric double layer capacitors 601 varies with the energization time, a plurality of determination times are set, and a threshold is set for each time, which improves performance in the detection of large current that that affects the electric double layer capacitors 601.

(3-6)

With press device 1 in this embodiment, a plurality of capacitor units 60 are provided. A current sensor 61 (an example of a current detector) is provided for each of the capacitor units 60. Stop control is performed to stop the supply of current from all the capacitor units 60 to the servomotor 21. The controller 10 (an example of a control unit) executes stop control when it has been determined that the average value of the current supplied from at least one capacitor unit 60 is over a specific threshold.

Consequently, in a configuration in which a plurality of capacitor units 60 are provided, it is possible to detect the flow of a large current in a short time, which would adversely affect the electric double layer capacitors 601.

(3-7)

With press device 1 in this embodiment, each capacitor unit 60 (an example of a power storage unit) has a plurality of electric double layer capacitors 601 (an example of a storage device). This allows a large amount of power to be stored.

(3-8)

The method for controlling the press device of this embodiment comprises step S31 (an example of a detection step) and steps S33, S36, S39, S42, S45, S34, S37, S40, S43, and S46 (an example of a stop step). Step S31 (an example of a detection step) involves detecting the current supplied from the capacitor units 60 to the servomotor 21 that drives the slide 2. Steps S33, S36, S39, S42, S45, S34, S37, S40, S43 and S46 (an example of a stop step) involve stopping the supply of current from the capacitor units 60 to the servomotor 21 on the basis of the detected value in step S31 (an example of a detection step).

Consequently, when a large current flows from the capacitor units 60 in a short time and leads to degradation of the capacitor units 60, the supply of current from the capacitor units 60 to the servomotor 21 can be stopped. Therefore, it is possible to suppress the influence that the flow of a large current in a short time would have on the electric double layer capacitors 601, and to reduce the capacity reduction and service life deterioration, allowing the deterioration in storage performance to be reduced.

4. Other Embodiments

An embodiment of the present invention was described above, but the present invention is not limited to or by the above embodiment, and various modifications are possible without departing from the gist of the invention.

(A)

In the above embodiment, five different determination times (2 msec, 10 msec, 20 msec, 50 msec, and 100 msec) are provided, but five is not the only option, and there may be just one.

(B)

In the above embodiment, the supply of current from the four capacitor units 60 is stopped by turning off the short circuit contactor 44, but the supply of current from the capacitor units 60 may be stopped by stopping the servomotor 21. In this case, the short circuit contactor 44 need not be provided, and the stop execution unit 76 transmits a stop command to the servo amplifier 22.

Since this stops the drive of the servomotor 21, the supply of current from the capacitor units 60 to the servomotor 21 can also be stopped.

(C)

In the above embodiment, the determination is made using the average value of the current values, but the determination may instead be made using the integrated value of the current.

(D)

In the above embodiment, the peak of the current value is detected, and stoppage of the current supply from the capacitor units 60 is determined in a determination time centered on this peak, but this is not the only option. For example, the determination may be made using data going back 2 msec, 10 msec, 20 msec, 50 msec, and 100 msec from each point at which the data is acquired.

(E)

In the above embodiment, four capacitor units 60 in which 24 electric double layer capacitors 601 are connected in series are provided, and these four capacitor units 60 are connected in parallel, but the number and connection configuration are not limited to these.

(F)

In the above embodiment, the electric double layer capacitors 601 are used as an example of a power storage device, but electric double layer capacitors are not the only option, and aluminum electrolytic capacitors or the like may be used instead. In other words, the power storage device may be any type that is capable of storing an electrical charge. In addition, a power storage unit, of which the capacitor units 60 are an example, may be provided with a plurality of such power storage devices.

The press device and the method for controlling the press device of the present invention have the effect of allowing a reduction in the deterioration of storage performance, and are useful on a factory production line, for example.

The invention claimed is:

1. A press device, comprising:
a slide configured to have an upper die mounted thereon;
a bolster disposed below the slide, the bolster being configured to have a lower die placed thereon;
a servomotor configured to drive the slide;
a power storage unit configured to supply stored power to the servomotor;
a current detector configured to detect current supplied from the power storage unit; and
a controller configured to perform a stop control to stop supply of the current from the power storage unit to the servomotor when it is determined that an average value of the current supplied from the power storage unit within a specific determination time has exceeded a specific threshold.

2. The press device according to claim 1, further comprising:
a shutoff unit configured to shut off a line of current from the power storage unit to the servomotor,
the controller being further configured to perform the stop control by operating the shutoff unit.

3. The press device according to claim 1, further comprising:
a servo amplifier configured to control the servomotor,
the controller being further configured to perform the stop control by outputting a servomotor stop command to the servo amplifier.

4. The press device according to claim 1,
wherein the controller includes
an acquisition unit configured to acquire the detection value of the current detector at specific time intervals, a peak detector configured to detect a peak of current value based on the detection value, a calculator configured to calculate the average value of the current during the determination time, around the peak of the current value, a determination unit configured to
compare the average value of the current calculated by the calculator with the specific threshold, and
determine whether or not the average value of the current is over the specific threshold, and a stop execution unit configured to perform the stop control when it is determined by the determination unit that the average value of the current is over the specific threshold.

5. The press device according to claim 1,
wherein
a plurality of determination times of different duration are provided,
the specific threshold is provided in association with each of the determination times, and
the longer is the determination time, the lower is a corresponding specific threshold set.

6. The press device according to claim 1,
wherein
a plurality of power storage units are provided,
the current detector is provided for each of the power storage units,
the stop control is a control to stop the supply of current from all the power storage units to the servomotor, and
the controller is further configured to execute the stop control when it has been determined that the average value of the current supplied from at least one of the electrical power storage units is over the specific threshold value.

7. The press device according to claim 1, wherein
the power storage unit includes a plurality of storage devices, and
the storage devices are electric double layer capacitors.

8. A method for controlling a press device, the method comprising:
detecting a current supplied from a power storage unit to a servomotor configured to drive a slide;
determining whether an average value of the current supplied from the power storage unit within a specific determination time has exceeded a specific threshold, and
stopping supply of the current when the average value has exceeded the specific threshold.

9. The press device according to claim 2, wherein
the shutoff unit is a short circuit contactor.

* * * * *